(12) United States Patent
Brannon

(10) Patent No.: US 6,457,764 B1
(45) Date of Patent: Oct. 1, 2002

(54) CONCEPT VEHICLE

(76) Inventor: Donald J. Brannon, 187 Waterton, Williamsburg, VA (US) 23188-8400

( * ) Notice: Subject to any disclaimer, the term of this patent is extended or adjusted under 35 U.S.C. 154(b) by 0 days.

(21) Appl. No.: 09/828,910

(22) Filed: Apr. 10, 2001

Related U.S. Application Data

(60) Provisional application No. 60/217,715, filed on Jul. 12, 2000.

(51) Int. Cl.[7] .............................................. B60R 11/00
(52) U.S. Cl. ....................................... 296/24.1; 410/89
(58) Field of Search ................................ 296/24.1, 37.6; 105/372, 375; 410/101, 102, 106, 89, 116

(56) References Cited

U.S. PATENT DOCUMENTS

| | | | | |
|---|---|---|---|---|
| 1,944,439 A | * | 1/1934 | Larsen | 296/24.1 |
| 2,793,907 A | * | 5/1957 | Hess et al. | 296/106 |
| 2,803,201 A | * | 8/1957 | Johnson et al. | 410/106 |
| 2,892,421 A | * | 6/1959 | Adler | 410/102 |
| 3,291,520 A | * | 12/1966 | Smith | 296/24.1 |
| 3,367,286 A | * | 2/1968 | Jantzen | 410/102 |
| 3,756,650 A |  | 9/1973 | Michel | 296/137 C |
| 4,067,263 A |  | 1/1978 | Naffa et al. | 105/499 |
| 4,488,333 A | * | 12/1984 | Tracy | 410/101 X |
| 5,037,153 A |  | 8/1991 | Stark | 296/37.6 |
| 5,845,952 A |  | 12/1998 | Albertini et al. | 296/37.6 |
| 5,927,783 A |  | 7/1999 | Baka | 296/37.6 |

FOREIGN PATENT DOCUMENTS

| DE | 3128053 | * | 2/1953 | 296/24.1 |
|---|---|---|---|---|

* cited by examiner

*Primary Examiner*—Dennis H. Pedder
(74) *Attorney, Agent, or Firm*—Patent & Trademark Services; Thomas Zack; Joseph H. McGlynn

(57) ABSTRACT

A vehicle whose cargo compartment can be opened or enclosed. The cargo compartment has a retractable top cover which can engage an extended tail gate door. Raised sides of the cargo compartment are fitted with outside side doors leading to storage compartments, shelves and trays for small items. Within the main cargo compartment cleats are mounted to the side walls. These cleats may be used to tie down objects within the compartment or to engage side hooks on partitions to form multiple storage layers. The number and spacing of the cleats along the walls may vary as desired to form different configurations of partitions. The rear tail gate has an extended portion which fits telescopingly into the lower portion of the tail gate. When this extended portion is fully raised to engage the closed top cover, the main cargo compartment is fully enclosed. The top cover may slide on side rails and may be manually or powered to retract or extend. Appropriate locks may lock the extended tail gate and closed top cover in position to each other as well as locking the raised outside side doors.

4 Claims, 4 Drawing Sheets

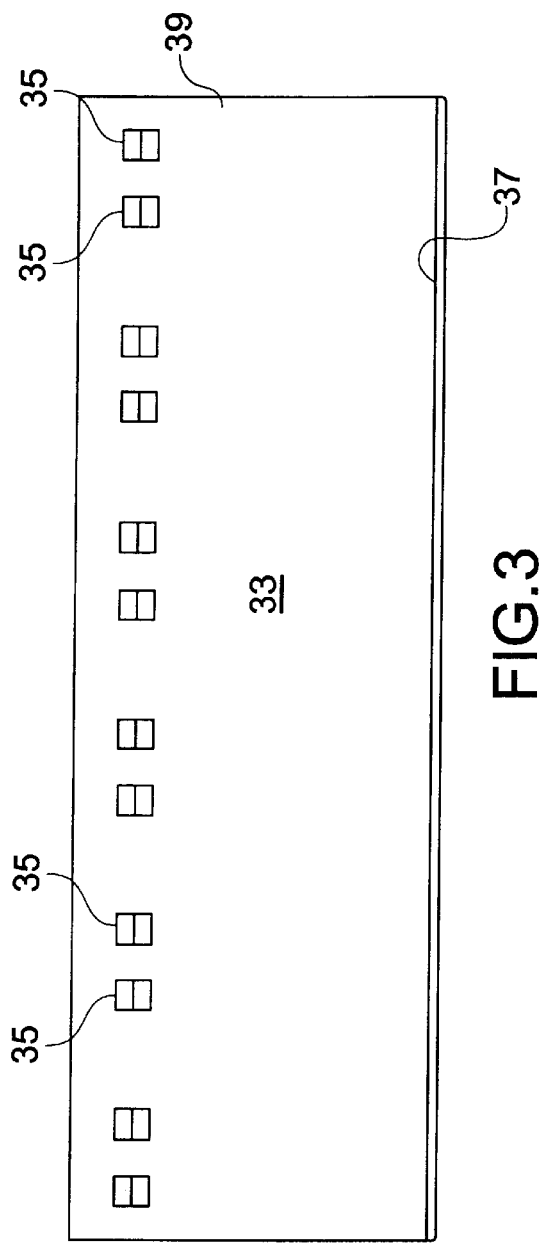
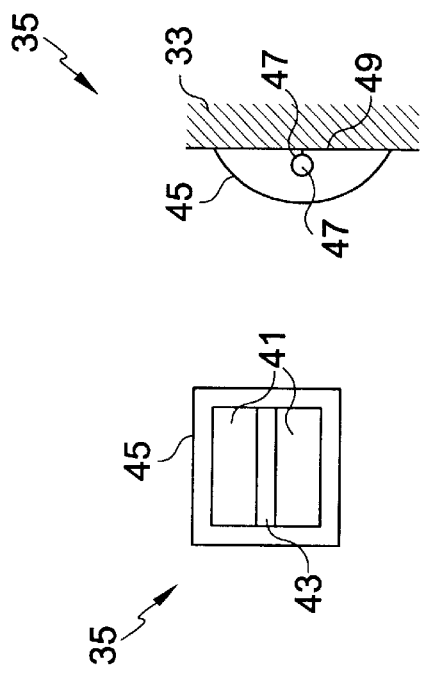
FIG.3
FIG.4a
FIG.4b

CONCEPT VEHICLE

This invention claims the benefit of the U. S. Provisional application No. 60/217,715 filed on Jul. 12, 2000.

BACKGROUND OF THE INVENTION

The present invention relates to a vehicle having raised sides, an opened top and a retractable cover to close the opened top.

Many types of doors and covers for open bed vehicles are known. For example, in one such earlier system a three way door for a cargo compartment has an upper part of the door that slides into a lower portion to open half of the cargo area with the bottom part of the door pivoting out to open the entire cargo area. In another earlier truck an after market cargo compartment invention is disclosed having raised sides and a foldable cover to close the open top.

Another prior art cargo compartment invention has a series of attachments along the inner sides to secure cargo restraint bars.

Still another such invention discloses a pickup truck having a horizontal storage area extending across the width of the cargo area and a step on the outside of the truck body.

One additional truck related invention discloses raised sides and cargo compartments in the outside of the raised sides. While another pickup truck related invention has horizontal members to divide the cargo area into an upper and lower area.

DESCRIPTION OF THE PRIOR ART

Doors and compartments for opened bed vehicles are known. For example, U.S. Pat. No. 2,793,907 to Hess et al. discloses a three way door for a cargo compartment wherein an upper part of the door slides into a lower portion to open half of the cargo area with the bottom part of the door pivoting out to open the entire cargo area.

U.S. Pat. No. 3,756,650 to Michel discloses a truck cargo compartment invention with raised sides and a foldable cover to close the open top.

U.S. Pat. No. 4,067,263 to Naffa et al. discloses a cargo compartment invention with a series of attachments along the inner sides to secure cargo restraint bars.

U.S. Pat. No. 5,037,153 to Stark discloses a pickup truck having a horizontal storage area extending across the width of the cargo area and a step on the outside of the truck body.

U.S. Pat. No. 5,845,952 to Albertini et al. discloses a truck related invention with raised sides and cargo compartments in the outside of the raised sides.

U.S. Pat. No. 5,927,783 to Baka discloses a pickup truck related invention having horizontal members to divide the cargo area into an upper and lower area.

In the present invention a three part door on an open vehicle has cleats used to divide the cargo area into upper and lower areas all as will be detailed in the specification that follows hereafter.

SUMMARY OF THE INVENTION

This invention relates to a pickup truck having an improved bed cover and interior cleats to divide the compartment into upper and lower storage areas.

It is the primary object of the present invention to provide for an improved truck tail gate opener and interior cargo compartment divider system.

Another object is to provide for such a system in which side wall mounted cleats are used to support panels that divide the compartment into upper and lower partitions.

These and other objects and advantages of the present invention will become apparent to readers from a consideration of the ensuing description and the accompanying drawings.

BRIEF DESCRIPTION OF THE DRAWINGS

FIG. 3 is a side wall of the vehicle's cargo compartment with cleats mounted.

FIGS. 4(a) and 4(b) are front and side views, respectively, of one of the cleats used in FIG. 3.

DESCRIPTION OF THE PREFERRED EMBODIMENT

Figure 1:
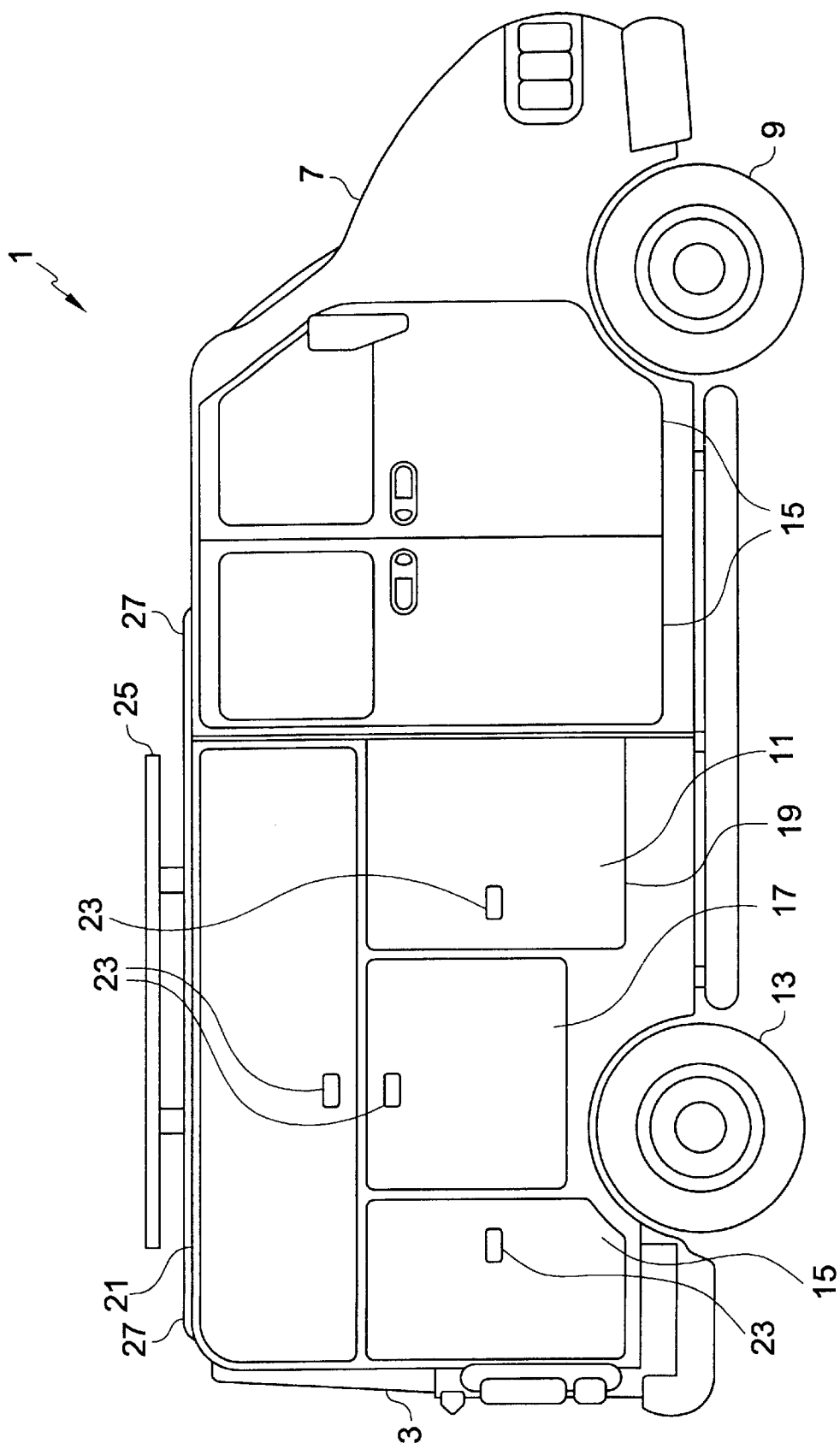
FIG. 1 is a side front view of a vehicle incorporating the present invention with the rear tail gate in an up and closed position.

FIG. 1 is a side front view of a vehicle 1 incorporating the present invention with the rear tail gate 3 in an up and closed position. The front cab over engine portion is conventional and includes two exit/entry side-by-side doors 5 on each side of the vehicle, two shown, the front engine compartment 7, and front wheels 9. Extending lengthwise of the vehicle and attached to its undercarriage are two lower side running boards 11 one of which is shown. Behind the passenger and driver front cab are the rear wheels 13 and the cargo compartment. Hinged side doors 15, 17, 19 and 21 opening to the outside allow shelves and other compartments within the interior cargo compartment to be visited by a user.

Locks may be provided on each door and there may be handles 23 to pivot the shown closed doors to opened positions. Above the side doors are two side mounted roof racks 25, the near side one being shown. These roof racks are used to haul tied down objects, like ladders, pipes, etc., whose overall dimensions are too large to permit them to be stored within the confines of the rear cargo compartment. The two roof racks are normally parallel to each other and extend along the two sides of the cargo compartment. Between these two racks 25, is a retractable top opening cover 27 shown in the closed position.

The cover 27 extends most, if not all, of the length of the cargo compartment and may side is side rails near the racks 25. The cover may be manually or power controlled to open or close as desired. When the tail gate 3 is closed, as shown, and the cover 27 is also closed, the cargo compartment forms a box-like enclosure to protect carried objects in the cargo compartment from the weather conditions and possible thief. The lower side running boards 11 permit a user to step on them to lift or lower objects carried by the over compartment racks 25.

Figure 2A:
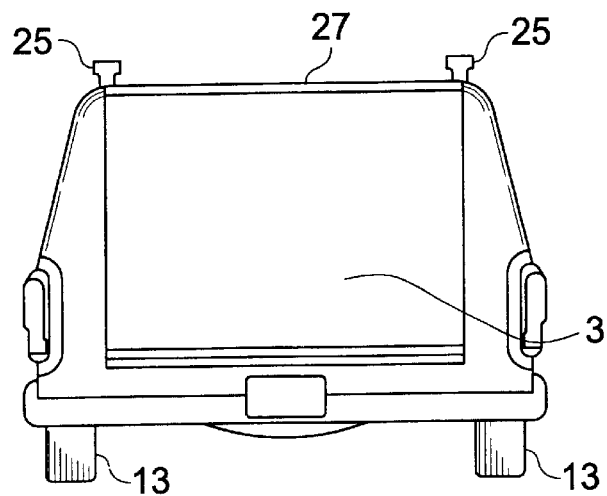
FIGS. 2(a)–(c) show a rear view of the FIG. 1 vehicle with the tail gate completely down, opened half way, and totally closed, respectively.
Figure 2B:
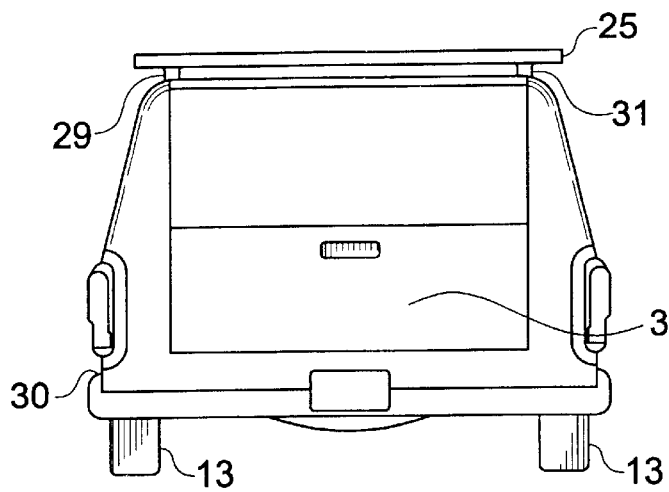
Figure 2C:
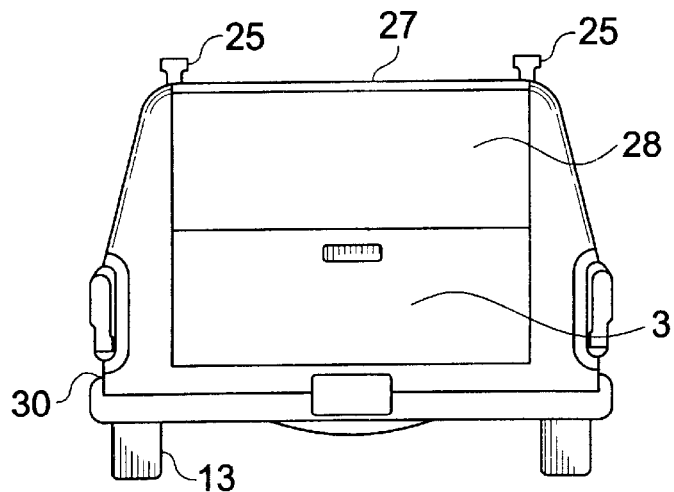

FIGS. 2(a)–(c) show a rear view of the FIG. 1 vehicle in different possible tail gate and top cover combination stages or positions. In one stage, FIG. 2(a), the tail gate is completely down with the top opened. In another stage, FIG. 2(b), the top cover is opened and the tail gate partially closed and raised vertically. And in the last figure, FIG. 2(c), both the top cover and the tail gate are both closed completely. In the FIG. 2(a) position the tail gate 3 is pivoted down or opened to a horizontal position and the top cover 27 is slid back to a fully opened position away from the tail gate and towards to the cab to its fully retracted position next to the vehicle's front passenger/driver cab. The cover 27 moves along the length of the top surface of the cargo compartment on two side mounted rails just below and between the bottom of the racks 25. Several types of conventional retractable covers may be used for the top cover 27 such as the truck bed cover made by the Pace Edwards Company of Centralis, Wash.

FIG. 2(b) shows the tailgate 3 of FIG. 2(a) is a partially closed raised position with the top cover opened. By providing for pivots or collars that engage each at opposite supporting ends of each roof rack 25 with some type of detachable roof fastener at the other ends of the individual racks, each rack may have its roof fastener detached and the rack pivoted to extend widthwise over the lower cargo compartment. By making the rack's pivots on opposite ends of the two racks, when the racks are positioned over the cargo compartment two spaced parallel racks are positioned. For example, if rack side support 29 is a pivot support attached to the roof at one end and the rack at the other end, then the other roof rack support 31 is detachably held to the opposite side roof. The other second roof rack 25, not shown in FIG. 2(b), would have a similar construction at its two ends with the pivot support being on the opposite end side from the first roof rack. With the roof racks over the cargo compartment large items to be hauled can be tied to the racks and extend the length of the cargo compartment and even over the vehicle's cab portion. This is true whether the intermediate top cover 27 is fully, partially, or completely opened or closed to cover the cargo compartment.

FIG. 2(c) show the tail gate 3 closed as in FIG. 2(b) with the tail gate 3 top surface component 28 moved up to engage the top cover 27. This forms the most closed position for the tail gate and the most enclosed position for the cargo compartment. By constructing the tail gate such that its upper component 28 would retract telescoping into the lower component, i.e. the raised component shown in FIG. 2(b), the extended upper portion may engage and lock with the lower trailing edge of the top cover 27, as shown. A step pad 30 across the rear bumper is for users to stand on to reach items from the rear end of the vehicle.

FIG. 3 is a side wall 33 of the vehicle's interior cargo compartment with spaced separate cleats 35 mounted on the wall. The cleats 35 are shown grouped in pairs with six pairs approximately horizontal to each other and at the same level above cargo bed floor 37. As described in more detail in FIGS. 4(a) and 4(b), each of the individual cleats 35 has a mid portion opened portion with a center bar extending across the opening to permit a hook to be engaged. There are two interior side spaced walls 33 facing each other each with cleats spaced above the cargo compartments floor 37 the same distance. The two side walls 33 along with cab's back wall, the rear tail gate 3, the top cover 27 and the floor 37 form an enclosure for objects located within the cargo compartment. The doors previously described in FIG. 1, would have their compartments and interior shelves ending where they meet the opposite surface of the side walls 33. The cleats 35 may be either detachably or permanently mounted on the side walls by conventional fasteners. A flat partition 39, such as a board, is shown in dotted line format, mount on the pair of cleats to the right.

FIGS. 4(a) and 4(b) are front and side views, respectively, of one of the cleats 35 used in FIG. 3. In the front view, FIG. 4(a), the wall mountable cleat 35 appears to have a generally square frame outline with an opened mid portion 41. Extending across the opened space 41 is an attachment center bar 43 whose ends are rigidly fixed to the cleat's frame 45 at its back. The bar or rod 43 may be a round cylindrical rod with its ends attached to the frame. In FIG. 4(b) the two opposite sides of the frame 45 are shown bowed out with the bar 43 attached at each end to a side support 47 mounted to the side backing 49. With this construction of the cleat, the bar 43 extends outwardly from the backing 49 which lies flush with the wall 33. The bowed out side frame members prevent lateral shifting of a hook engaged by the bar 43.

Figure 5:
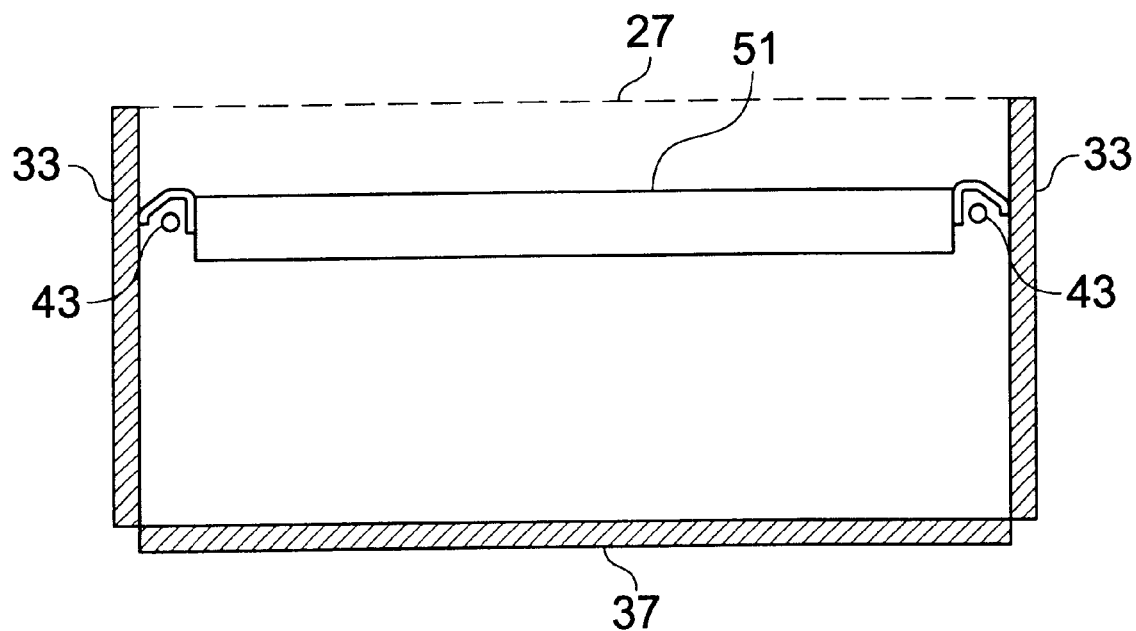
FIG. 5 is a side schematic view of a horizontal partition with side hooks used to mount the partition to the cleats of FIGS. 3, 4(a) and 4(b).

FIG. 5 is a side schematic view of a horizontal partition 51 with side hooks 53 used to mount the partition to the cleats of FIGS. 3, 4(a) and 4(b). The partition 51 divides the cargo compartment into upper and lower volumes each of which is capable of supporting hauled objects. The lower volume is defined between the floor 37 and the bottom surface of the partition whereas the upper volume is above the partition 51 and extends to the closed top cover or, if the cover is opened, the volume above the same. Each partition 51 has two side spaced hooks 53 on each of its sides that each engage a separate bar 43 of a separate wall mounted cleat 35. Since, the partitions are detachably mounted to the cleats by their hooks, the number of partitions that can be used can be varied as desired with supporting cleats depending on the loads to be carried. If desired several rows of cleats, each like the ones shown in FIG. 3 can be mounted at different heights above the floor 37 to support multi-layers of partitions. Further, the partitions may be totally or partially eliminated from the cargo compartment and the wall mounted cleats used with ropes, or cords to tie down objects placed in the cargo compartment. This dual function of the cleats provides for a greater use of them than simply partition end supports.

With the present invention the advantages of an opened pickup truck bed and a closed cargo compartment are combined in one vehicle. When the top cover is opened and the tail gate down, large objects may be placed into the cargo compartment. If the tail gate is partially raised, then shorter length objects can be placed within the cargo compartment. To provide for still greater security, the top cover can be pulled completely across the roof to engage the extended tail gate, see FIG. 2(c), and locked in position to the tail gate. Additionally all of the side doors may all be locked. This prevents the easy theft of articles with the main cargo compartment and the side compartments through the side doors in the raised sides.

The described embodiment of the invention has a cab over the vehicle's engine, five inside seats for passenger, four doors, and raised side to the roof line with storage compartments accessible to the outside. In addition, the storage compartment can be opened or enclosed and the tail gate has three distinct positions. The top cover may be left fully opened or may be fully closed to protect against the weather and theft. The roof racks can be moved to two distinct positions for tying down or transporting long object that will not fit within the storage compartment. Long step bars are provided with interior cleats in the storage compartment to tie down and for supports for compartment partitions. All of these improvements are accomplished on a standard length pickup that can be provided with improved airflow and gas mileage.

In one embodiment the overall length of the vehicle was 220 inches with a main interior storage cargo compartment of 98 inches long by 50 inches wide. The outside side doors were accessible to interior shelves, dividers, bins, trays and interior drawers. With the top cover closed and the tail gate fully extended, the vehicle has a reduced drag coefficient of friction with reduce air flow drag and increased gasoline mileage. Additional storage space on the roof rack exists outside the vehicle's storage compartments for very long items, like pipes, ladders, etc. If desired the roof racks can be removed and plastic plugs inserted into the spots where their four roof support holes were.

Although the Concept Vehicle and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A vehicle having a cargo compartment comprising:

a vehicle with an openable and closable cargo compartment with means for opening and closing the cargo compartment, said vehicle having an engine compartment and ground engaging wheels, said cargo compartment having two interior side spaced walls facing each other and a lower floor;

a plurality of cleats mounted on each of said two interior side spaced walls, the plurality of cleats on one side wall being approximately the same distance above the lower floor as the plurality of cleats on the other facing side wall, a partition extending between the cleats on one side wall to the cleats on the other side wall and located at appropriately the same distance above the lower floor, said partition having end mounts to mount the partition to a least one cleat on each wall; and each of said cleats forming the plurality of cleats having a member to engage the end mounts of the partition to retain the partition in place above the floor, and wherein each of said cleats has a backing which lies substantially flush with each of the side walls and a frame with an opened portion, said member on the cleat used to engage end mounts of the partition including a bar extending across the opened portion of each cleat and rigidly fixed to the frame.

2. The vehicle as claimed in claim 1, wherein said end mount for the partition includes a hook mounted to an end of the partition, said hook extending over the bar of a cleat to retain the partition in place.

3. The vehicle as claimed in claim 2, wherein there is at least two cleats detachably mounted to each side wall at approximately the same distance above the floor, each of said two cleats being engaged by a hook mounted on the end of the partition.

4. The vehicle as claimed in claim 3, wherein the means for opening and closing the cargo compartment are doors, said vehicle also having a top cover and a rear tail gate with an extended portion, said extended portion fitting telescopingly into a lower portion of the tail gate, said extended portion, when raised, being engageable by the top cover of the cargo compartment to enclose the cargo compartment.

* * * * *

UNITED STATES PATENT AND TRADEMARK OFFICE
CERTIFICATE OF CORRECTION

PATENT NO. : 6,457,764 B1
DATED : October 1, 2002
INVENTOR(S) : Donald J. Brannon It is certified that error appears in the above-identified patent and that said Letters Patent is hereby corrected as shown below:

<u>Column 1,</u>
Line 16, change "appropriately" to -- approximately --.

Signed and Sealed this

Fourth Day of February, 2003

JAMES E. ROGAN
*Director of the United States Patent and Trademark Office*